United States Patent
Dutta (10) Patent No.: US 7,307,653 B2
(45) Date of Patent: Dec. 11, 2007

(54) IMAGE STABILIZER FOR A MICROCAMERA MODULE OF A HANDHELD DEVICE, AND METHOD FOR STABILIZING A MICROCAMERA MODULE OF A HANDHELD DEVICE

(75) Inventor: Amit Dutta, Tokyo (JP)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 09/999,020

(22) Filed: Oct. 19, 2001

(65) Prior Publication Data

US 2003/0076421 A1 Apr. 24, 2003

(51) Int. Cl.
*H04N 5/228* (2006.01)
*H04N 5/225* (2006.01)
*G03B 17/00* (2006.01)

(52) U.S. Cl. .............. 348/208.7; 348/374; 396/55

(58) Field of Classification Search ............. 348/208.7, 348/208.8, 208.11, 208.99, 208.2, 208.4, 348/208.14, 208.13, 373, 374, 376, 208.5, 348/208.6; 250/208.1; 396/52, 53, 54, 55
See application file for complete search history.

(56) References Cited

U.S. PATENT DOCUMENTS

| | | | |
|---|---|---|---|
| 3,942,862 A | 3/1976 | Furukawa et al. ............. 350/16 |
| 4,322,128 A | 3/1982 | Brake ........................... 350/16 |
| 4,731,669 A | 3/1988 | Hayashi et al. | |
| 5,450,126 A * | 9/1995 | Nishida .................... 348/208.7 |
| 5,460,341 A * | 10/1995 | Katsuyama et al. ..... 348/208.7 |
| 6,531,804 B2 * | 3/2003 | Kasahara .................... 348/374 |
| 6,611,079 B2 * | 8/2003 | Koga et al. ................. 310/309 |
| 6,686,954 B1 * | 2/2004 | Kitaguchi et al. ........ 348/208.1 |
| 6,781,622 B1 * | 8/2004 | Sato et al. ................ 348/208.4 |
| 6,798,984 B2 * | 9/2004 | Antikidis ................. 348/208.7 |
| 7,208,905 B2 * | 4/2007 | Shibatani ............... 348/208.99 |
| 2003/0067544 A1 * | 4/2003 | Wada ....................... 348/208.7 |
| 2003/0076408 A1 * | 4/2003 | Dutta ..................... 348/207.99 |

(Continued)

FOREIGN PATENT DOCUMENTS

EP 483530 A2 * 5/1992

(Continued)

OTHER PUBLICATIONS

Koga et al.; "Attachment/Detachment Electrostatic Micro Actuators for Pan-tilt Drive of a Mirco CCD Camera"; 1996; IEEE; pp. 509-514.*

(Continued)

*Primary Examiner*—John M. Villecco
(74) *Attorney, Agent, or Firm*—Harrington & Smith, PC (57) ABSTRACT

A method and a handheld device for stabilizing an image captured by an optical lens of a micro camera integral with the handheld device, which may, for example, be a mobile phone. Motion sensors sense motion of the device and are used to cause movement of the micro camera to substantially compensate for the sensed movement so as to maintain a steady, focussed image to be displayed by a display on the handheld device or elsewhere, such as a remote display. The micro camera is moved by one or more motion actuators which move the camera in a horizontal plane substantially perpendicular to an axis of the lens of the camera and/or move the camera so as to pivot the lens axis.

26 Claims, 8 Drawing Sheets

U.S. PATENT DOCUMENTS

| | | | |
|---|---|---|---|
| 2003/0197787 A1* | 10/2003 | Satoh et al. | 348/208.1 |
| 2004/0119836 A1* | 6/2004 | Kitaguchi et al. | 348/207.99 |
| 2005/0140793 A1* | 6/2005 | Kojima et al. | 348/208.99 |
| 2005/0168584 A1* | 8/2005 | Uenaka | 348/208.99 |
| 2005/0168585 A1* | 8/2005 | Uenaka et al. | 348/208.99 |
| 2005/0185057 A1* | 8/2005 | Seo | 348/208.4 |
| 2005/0190267 A1* | 9/2005 | Uenaka et al. | 348/208.99 |
| 2005/0190268 A1* | 9/2005 | Uenaka | 348/208.99 |
| 2005/0195286 A1* | 9/2005 | Uenaka et al. | 348/208.99 |
| 2005/0195287 A1* | 9/2005 | Uenaka | 348/208.99 |
| 2005/0195288 A1* | 9/2005 | Uenaka | 348/208.99 |
| 2005/0200712 A1* | 9/2005 | Uenaka | 348/208.99 |
| 2005/0200713 A1* | 9/2005 | Uenaka et al. | 348/208.99 |
| 2005/0206735 A1* | 9/2005 | Seo | 348/208.4 |
| 2005/0219374 A1* | 10/2005 | Uenaka | 348/208.12 |
| 2005/0225646 A1* | 10/2005 | Shintani | 348/208.99 |
| 2005/0259156 A1* | 11/2005 | Kosaka et al. | 348/208.7 |
| 2006/0017815 A1* | 1/2006 | Stavely et al. | 348/208.7 |
| 2006/0033818 A1* | 2/2006 | Wada et al. | 348/208.11 |
| 2006/0061660 A1* | 3/2006 | Brackmann | 348/208.1 |
| 2006/0077260 A1* | 4/2006 | Pyo et al. | 348/208.7 |
| 2006/0082658 A1* | 4/2006 | Lee et al. | 348/208.7 |
| 2006/0082659 A1* | 4/2006 | Koo | 348/208.99 |
| 2006/0092285 A1* | 5/2006 | Shin | 348/208.7 |
| 2006/0098098 A1* | 5/2006 | Seo | 348/208.99 |
| 2007/0076098 A1* | 4/2007 | Yasuda | 348/208.99 |
| 2007/0097218 A1* | 5/2007 | Chen | 348/208.7 |
| 2007/0109412 A1* | 5/2007 | Hara | 348/208.2 |

FOREIGN PATENT DOCUMENTS

| | | | |
|---|---|---|---|
| EP | 0 942 309 A2 | | 9/1999 |
| JP | 61 248681 | | 11/1986 |
| JP | 10 170971 | | 6/1996 |
| JP | 09116910 A | * | 5/1997 |
| JP | 10 142646 | | 5/1998 |
| JP | 10191144 A | * | 7/1998 |
| JP | 2000078254 A | * | 3/2000 |
| JP | 2000332225 A | * | 11/2000 |

OTHER PUBLICATIONS

Koga et al.; "Electrostatic Linear Micro Actuators with vibrating motion for Pan-tile Drive of a Micro CCD Camera"; 7th International Symposium on micro Machine and Human Science; IEEE; 1996; pp. 137-142.*

Oshima et al.; "VHS Camcorder with Electronic Image Stabilizer"; 1989; IEEE; pp. 749-758.*

Translation of EP 0483530 A2.*

* cited by examiner

IMAGE STABILIZER FOR A MICROCAMERA MODULE OF A HANDHELD DEVICE, AND METHOD FOR STABILIZING A MICROCAMERA MODULE OF A HANDHELD DEVICE

BACKGROUND OF THE INVENTION

1. Field of the Invention

The present invention relates to image stabilization, and, in particular, is directed to a method and hand held device for stabilizing an image.

2. Description of the Related Art

Handheld devices such as mobile or handheld terminals provide enormous flexibility over traditional wired telephone handsets. These handheld devices enable the communication of data, voice and/or video at locations other than a residence, office or payphone. To enhance such communication of information, many handheld devices have included special components and features. For example, handheld devices include micro camera modules to process and provide video and imagery.

One problem in providing video and imagery is to stabilize a previously focused image if the handheld device moves slightly. Current image stabilization methods use a normal camera having several lenses or prisms. However, micro camera modules are generally small in size, e.g., they may be only a few millimeters, and, because of their size, are generally restricted to having a single lens. As such, current image stabilization mechanisms that require multiple lenses or prisms are not appropriate for use with handheld devices having micro camera modules. There is thus a need in the art to provide image stabilization for handheld devices with micro camera modules.

SUMMARY OF THE INVENTION

The present invention is directed to a method and a handheld device for stabilizing an image captured by a hand held device. The handheld device has an optical lens assembly and an image sensor which capture a focussed image of an object. Movement of the handheld device is sensed by motion sensors in the handheld device. In response to the sensed movement of the handheld device, the micro camera module or merely the lens and image sensor are moved to compensate for the sensed movement to maintain the previously defined and focused image. The movement of the micro camera module or merely the lens and image sensor may be a pivoting/tilting or a translation.

The image stabilization device and method of the present invention has a variety of uses. In particular, for use as a videophone and for taking of video images, the handheld device can provide a video image substantially without motion, vibration, blur, and the like generally caused by unintended movements of the handheld device. The handheld device of the present invention can also take sharp, static pictures at a slow shutter speed because image stabilization compensates for the effects of hand movement associated with operation of the shutter of the camera.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
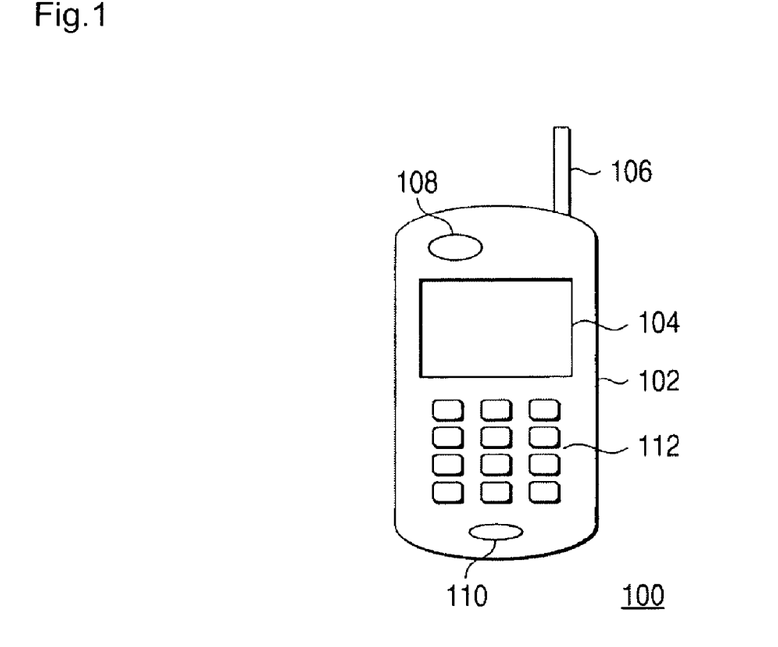
FIG. 1 depicts a front view of an exemplary handheld device.

FIG. 1 depicts a front view of an exemplary handheld device 100 which may be used with the present invention. The particular hand held device 100 shown is a mobile phone. The handheld device 100 is configured to transmit information in the form of text, voice, video sound and the like. The handheld device 100 comprises an outer case 102, a display 104, an antenna 106, a speaker 108, a microphone 110, and a keyboard 112. The outer case 102 defines the external structure of the handheld device 100. The display 104 is configured to display various forms of textual and video information. For example, the display 104 may display a list of telephone numbers or an image of an object.

The antenna 106 enables the transmission and reception of information to and from the handheld device 100. The speaker 108 transmits audio in the form of an audible signal to a user of the handheld device 100. The microphone 110 receives audio from the user of the handheld device 100. The keyboard 112 comprises one or more buttons or switches to facilitate the operation of the handheld device 100. For example, the keyboard 112 comprises buttons to power up the handheld device 100, to activate specific features of the handheld device 102, and to dial telephone numbers.

Figure 2:
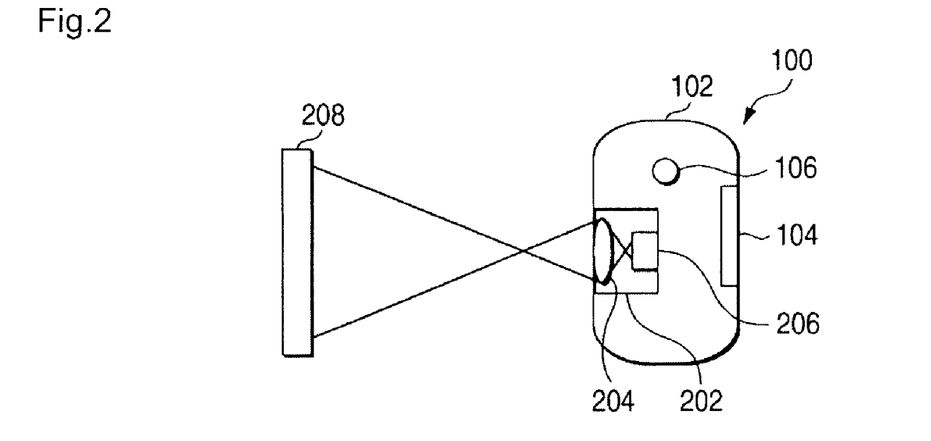
FIG. 2 depicts a top view of the handheld device of FIG. 1 depicting a micro camera module.

FIG. 2 depicts a top view of the handheld device 100 comprising a micro camera module 202 to focus and capture an object 208 and to provide an image for the captured object 208 on the display 104. The micro camera module 202 is designed to be sufficiently small to fit into the hand held device 110 and generally contains only a single lens 204, although more than one lens may be used. The lens 204 is used to focus an object 208 onto an image sensor 206 in the micro camera module 202. The image sensor 206 identifies the object as captured through the lens 204. Different embodiments of the handheld device 100 are further described with respect to FIGS. 4 and 5.

In the embodiment depicted in FIG. 2, the micro camera module 202 is used to focus and capture an object 208 disposed on a side of the handheld device 100 that is opposite to the side upon which the display 104 is mounted. For example, a user would use the handheld device 100 to point to an object 208 and then view an image of the object on the display 104. However, the handheld device 100 is not necessarily restricted to tracking an object disposed on the opposite side of the handheld device 100 as the display 104. For example, the micro camera module 202 may capture the user of the handheld device and create an image of the user for videoconferencing, e.g., the image is transmitted to a remote display device that is capable of providing videoconferencing.

Figure 3:
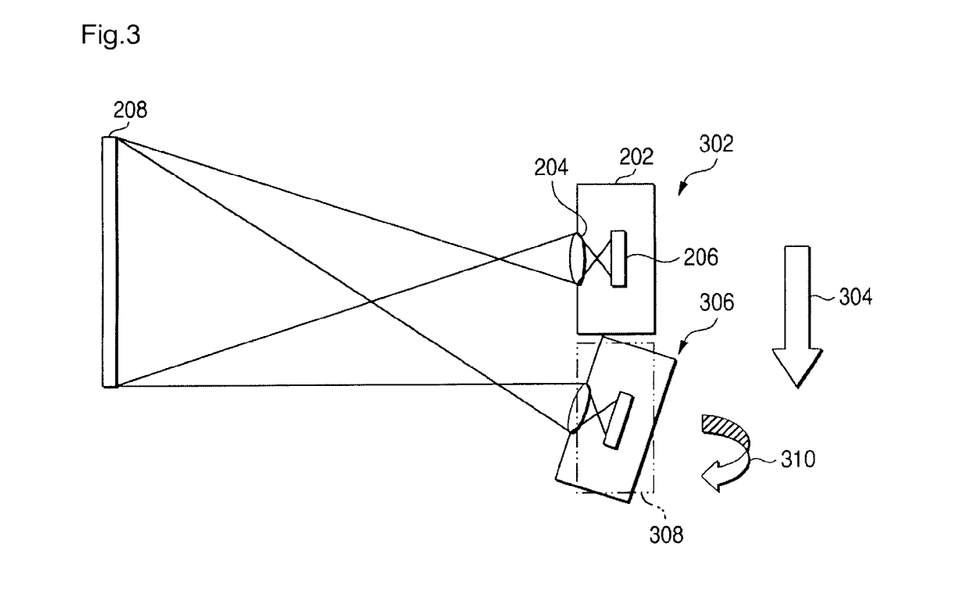
FIG. 3 depicts a stabilization of an image in accordance to the present invention.

FIG. 3 depicts the stabilization of an image in accordance with the present invention. The handheld device 100 is subject to one or more external forces, e.g., a shaking or vibration of a hand holding the handheld device 100 or other unintended movements of the handheld device 100, and is moved as shown by arrow 304. This movement causes the position of the image displayed on the display device 104 to change so that for example the desired image is no longer centered on the display 104. To prevent undesired changes in the image, image stabilization is employed.

The micro camera module 202, is initially located at a first position 302, the lens 204 focuses on an object 208 and the image sensor 206 captures the object. The handheld device 100 is moved, in a direction shown by arrow 304, such as by an unintended movement or shaking of the handheld device 100, to a second position 306, in which the position of the micro camera module 202 after this movement is shown with a dotted lines 308. To maintain substantially the same view of the object 208, at the least the lens 204 and the image sensor 206 of the micro camera module 202 must also be rotated in the direction shown by arrow 310. Depending upon the movement of the micro-camera module 202, such compensation movement of the micro camera module 202 within the handheld device 100 may also and/or alternatively comprise a lateral translation of the micro camera module 202.

Figure 4:
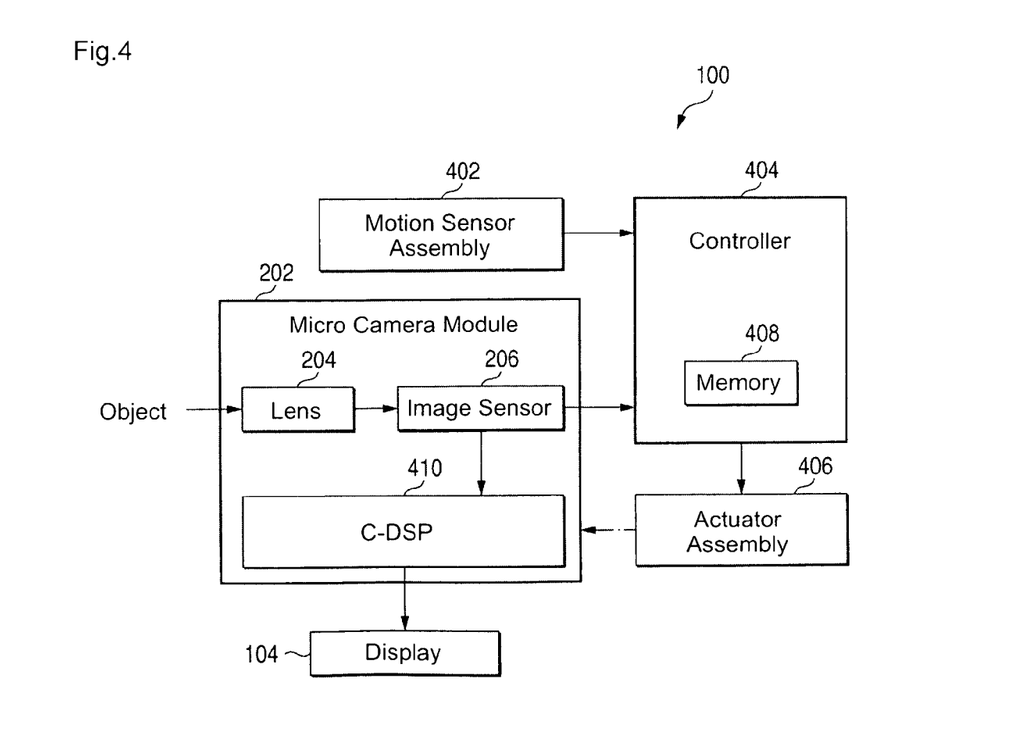
FIG. 4 depicts a block diagram of one embodiment of the handheld device.

FIG. 4 depicts a block diagram of one embodiment of the handheld device 100 of the present invention. In this embodiment, the handheld device 100 comprises a micro camera module 202, a motion sensor assembly 402, a controller 404, an actuator assembly 406 and a display 104. The micro camera module 202 has components suitable to implement a miniature-sized camera within a handheld device 100. For small handheld devices 100, such as mobile phones, generally there is only sufficient space in the device to house a single lens 204. However, if size is not a constraint, multiple lenses of a lens assembly may be used. The lens 204 may be in a set position so that only objects within a known range are in focus, or its position may be adjustable by an autofocus or manual focus mechanism which moves the lens to focus on an object within view at any range.

The micro camera module 202 also comprises an image sensor 206 and a camera digital signal processor (C-DSP) 410. The image sensor 206 defines or captures an image of an object 208 and generates an appropriate electrical signal corresponding to the captured image. Examples of the image sensor 206 include, but are not limited to a CCD (charge-coupled device) and a CMOS-based IC (integrated circuit). Such an image sensor 206 is typically approximately 4×4 mm in size. The camera digital signal processor 410 generates an electronic signal in response the image sensor 206 and transmits this signal to the display 104 which displays a visible image of the object.

The lens 204 typically will have a very short focal length of approximately 2 to 4 mm and a diameter of approximately 1 to 3 mm. The image sensor 206 will typically be approximately 4×4 mm in size. These sizes are merely illustrative as different sizes of these elements are possible depending upon the overall size of the hand held device 100 and the desired quality of the image to be displayed.

The motion sensor assembly 402 senses movement of the handheld device 100 such as shaking, vibrations and/or rotation of the handheld device 100. The motion sensor assembly 402 comprises one or more electronic motion sensors that sense movement of the handheld device 100. The motion sensor assembly 402 senses movement of the handheld device 100. The motion sensor assembly 402 comprises one or more motion sensors that preferably sense movement of the handheld device 100 in at least two, and preferably three, substantially perpendicular directions. Any type of motion sensor may be used, such as MEMS (microelectro mechanical systems) sensors, electronic motion sensors, micro machined motion sensors, and the like. In general, there are two types of motion sensors, accelerometers which detect and measure linear acceleration, and gyroscopes, which detect and measure angular rotation. It is preferred to use a motion sensor of the gyroscope type which detects and measures rotation because image destabilization is typically caused by movement of a hand holding the handheld device which movement is substantially rotational.

The controller 404 controls the image stabilization of the micro camera module 202 by determining a desired movement of the micro camera module 202 to compensate for movement of the handheld device 100 so as to maintain the view of the object 208. The controller 404 transmits the amount and direction of the desired movement in the form of a control signal to the actuator assembly 406. Memory 408 in the controller 404 stores data structures and any software modules or applications necessary to process the measured actual movement of the hand held device and to ascertain the appropriate compensation movement, as is known in the art.

The actuator assembly 406 comprises one or more actuators which are positioned in the hand held device to move the micro camera module 202 in accordance with instructions received from the controller 404. Examples of a suitable actuator include a piezo actuator, a MEMS actuator, a shaped memory alloy (SMA) which changes in length in response to an electrical bias, and other types of electromechanical actuators. For an image sensor 206 of approximately 4 mm×4 mm in size, a translation of approximately 20-50 micrometers and/or a rotation of approximately 0.2-1.0 degrees is typically adequate for sufficient image stabilization to compensate for the movement of the handheld device 100. Exemplary implementations of these embodiments are further depicted and described with respect to FIGS. 6A, 6B, 7A and 7B, which are discussed in detail below.

Figure 5:
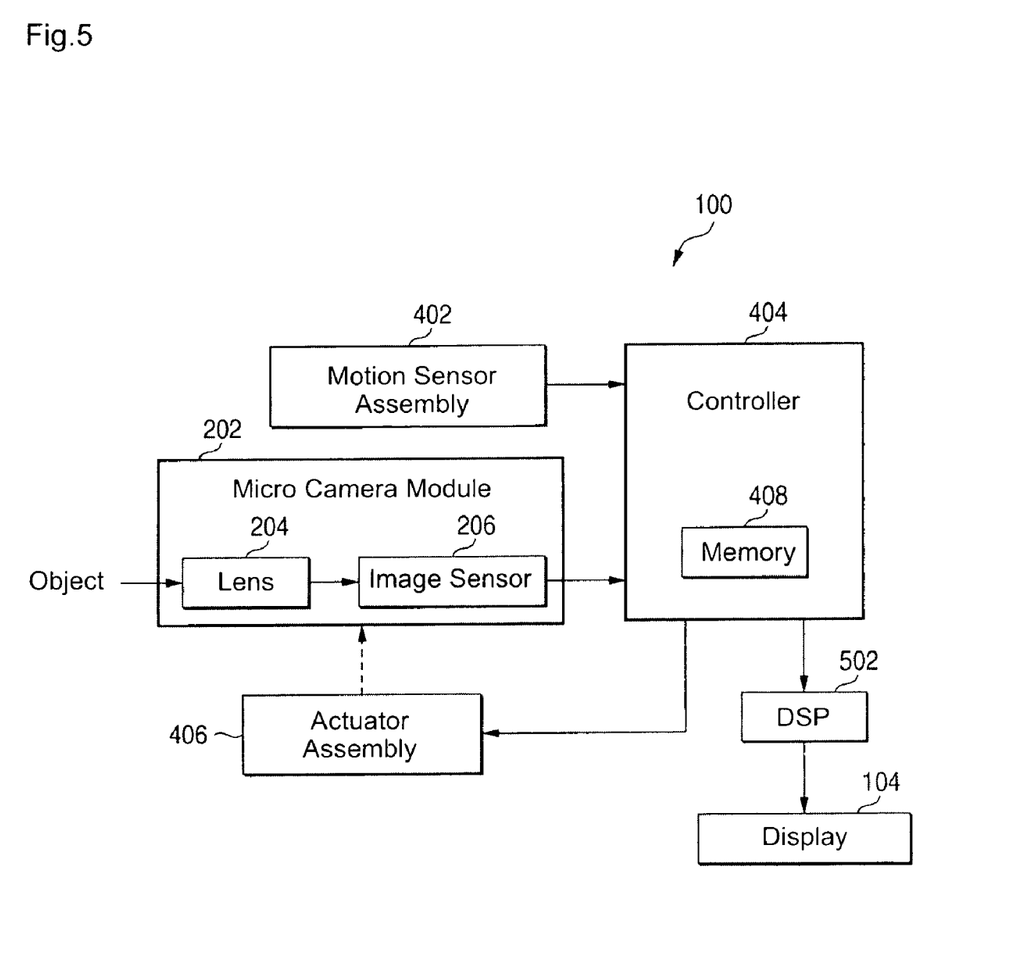
FIG. 5 depicts a block diagram of another embodiment of the handheld device.

FIG. 5 depicts a block diagram of another embodiment of the handheld device 100 of the present invention. In this embodiment, the handheld device 100 contains a lens 204 and an image sensor 206 but does not have a camera digital signal processor 410 as part of the micro camera module 202. The motion sensor assembly 402 and the controller 404 operate in substantially the same manner as the previous embodiment described with respect to FIG. 4. The actuator assembly 406 receives a signal from the controller to move the lens 204 and the image sensor 206 of the micro camera module 202. A digital signal processor 502 generates a signal to cause the display 104 to generate an image of the object. Exemplary implementations of the embodiments of FIG. 5 are further depicted and described with respect to FIGS. 8A, 8B, 9A and 9B, which are discussed in detail below.

Figure 6A:
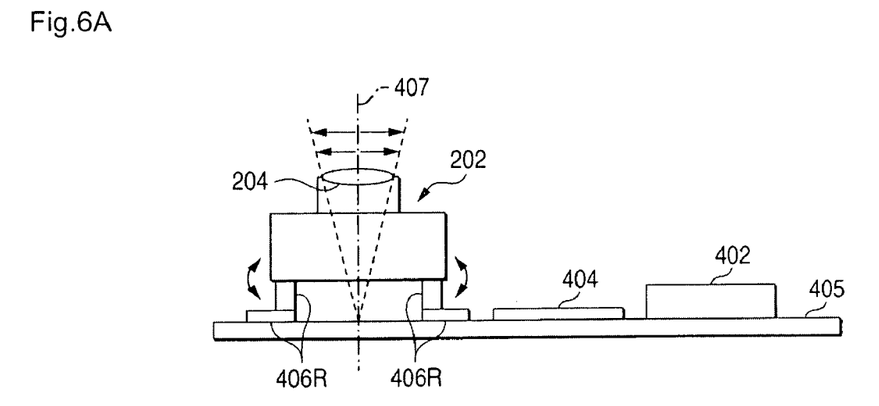
FIG. 6A depicts a side view of a first implementation of the embodiment of FIG. 4.
Figure 6B:
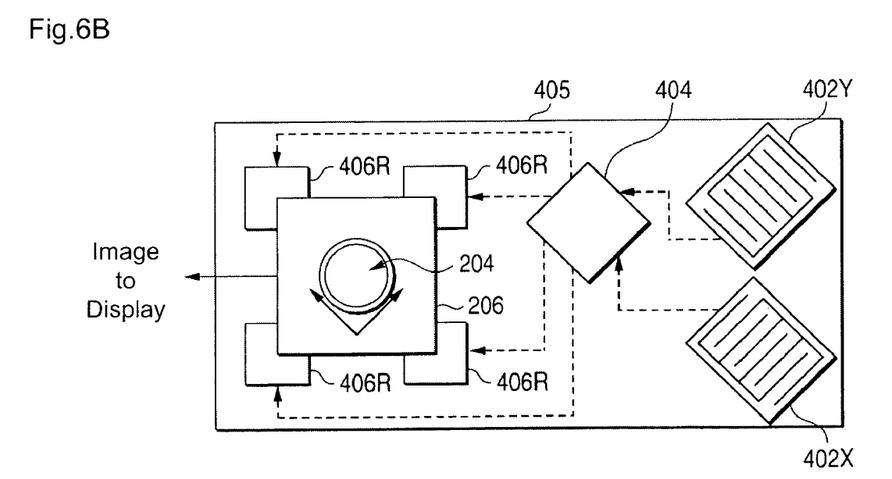
FIG. 6B depicts a top view of the implementation of FIG. 6A.

FIGS. 6A and 6B depict a side and a top view, respectively, of a first implementation of the embodiment of FIG. 4. In this implementation, the axis 407 of the lens 204 of the micro camera module 202 is pivoted, tilted or deflected in response to a movement of the handheld device 100, as shown by the arrows in FIG. 6A. The axis 407 is represented by a line which passes through a center of curvature of the lens 204. The motion sensor assembly 402 and the actuator assembly 406 are secured to a common plane, such as a circuit board 405 disposed within the hand held device 100. The lens 204 is disposed centrally over the micro camera module 202. The actuator assembly 406 comprises four actuators 406R disposed beneath each corner of the micro camera module 202 so as to support the camera module 202 on the circuit board 405. The actuators 406R are selected so that they are capable of compressing and expanding and, when mounted to the circuit board 405, are capable of pivoting the micro camera module 202 relative to the circuit board 405 as shown by the arrows in FIG. 6A. The movement of camera module 202 by the actuators 406R occurs in response to a signal from the controller 404.

Rather than being placed at the corners of the bottom of camera module 202, the actuators 406R may alternatively be positioned along the bottom edges of the camera module 202 or completely under the camera module. In addition, although four actuators 406R are shown, more or fewer than four actuators may be used. For example, only two actuators 406R are required with one actuator 406R being positioned at one corner of the camera module 202 and the other actuator 406R being positioned at a neighboring corner of the camera module 202. The camera module 202 is then mounted to the circuit board so that the camera module 202 is capable of pivoting upon activation of one or both of the actuators 406R. Such mounting can be accomplished by attaching the camera module 202 to the circuit board 405 at a third point by a resilient or hinged member. Alternatively, the two actuators 406R may be mounted along adjacent edges of the camera module 202.

The motion sensor assembly 402 comprises an X-direction motion sensor 402X and an Y-direction motion sensor 402Y. These motion sensors 402X and 402Y sense or detect motion or movement of the handheld device 100 in substantially perpendicular directions and provide the sensed motion information to the controller 404. The controller 404 then uses the received motion information to determine the required adjustment of the position of the micro camera module 202 to compensate for the movement of the handheld device 100 to stabilize the image being captured by the micro camera module 202.

Figure 7A:
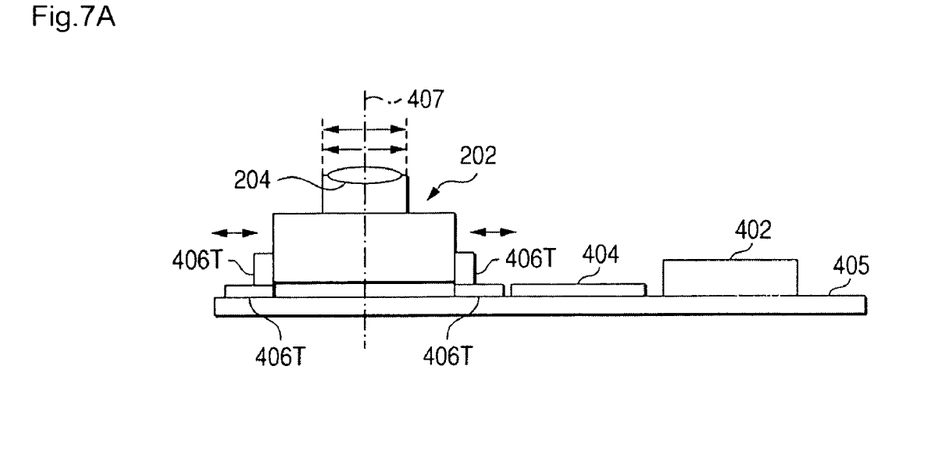
FIG. 7A depicts a side view of a second implementation of the embodiment of FIG. 4.
Figure 7B:
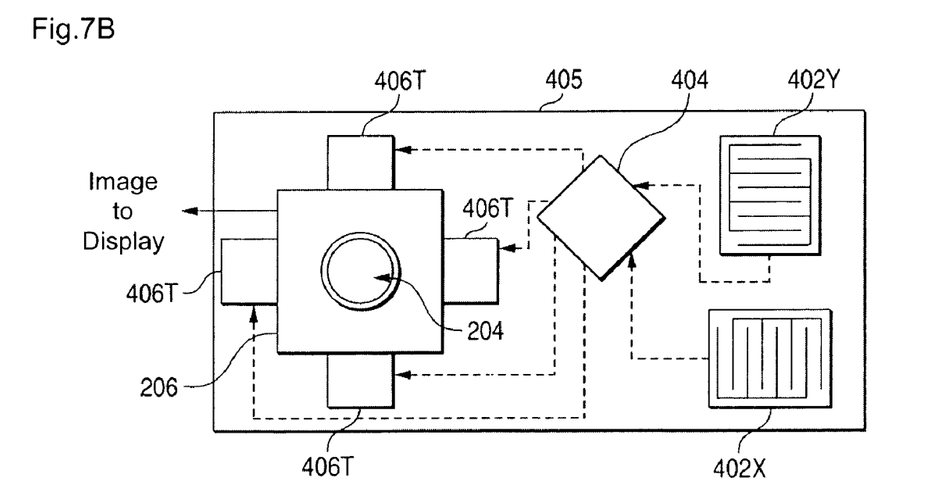
FIG. 7B depicts a top view of the implementation of FIG. 7A.

FIGS. 7A and 7B depict a side and top view, respectively, of a second implementation of the embodiment of FIG. 4. The implementation shown in FIGS. 7A and 7B is substantially identical to that shown in FIGS. 6A and 6B except that the micro camera module 202 is moved laterally relative to the circuit board 405 as shown by the arrow in FIG. 7A. The actuator assembly 406 illustratively comprises four actuators 406T disposed beneath each side or outer edge of the micro camera module 202. The actuators 406T are configured to provide a translation of the micro camera module 202 in two substantially perpendicular directions which are in a plane substantially perpendicular to the axis of the lens 204. To perform this translation, the actuators 406T are selected and positioned to cause the camera module 202 to move substantially parallel to the plane of the move the micro camera module 202 circuit board 405.

Although the four actuators 406T are shown as being disposed at corners of the camera module 202, alternatively they may be placed along edges of the camera module 202, or beneath the camera module 202. Additionally, more of fewer than four actuators 406T may be used. For example, only two actuators 406T are required, each being positioned at two adjacent edges or corners of the camera module 202, optionally with a means to stabilize the mounting of the camera module 202 onto the circuit board 405, such as a resilient or sliding member. Alternatively, the two actuators may merely be interposed between the camera module 202 and the circuit board 405.

In addition, the actuators 406 may be selected, positioned and orientated so that the micro camera module 202 can be moved in the way described with respect to FIGS. 6A and 6B, and also in the way described with respect to FIGS. 7A and 7B, that is, so that the axis of the lens of the micro camera module 202 can both pivot and so that the micro camera module 202 can move in a plane substantially perpendicular to the axis of the lens of the micro camera module 202.

Figure 8A:
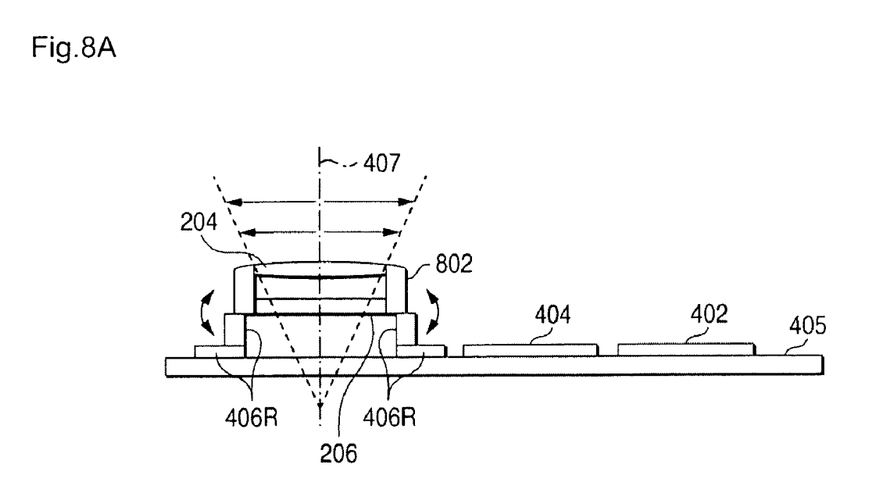
FIG. 8A depicts a side view of a first implementation of the embodiment of FIG. 5.
Figure 8B:
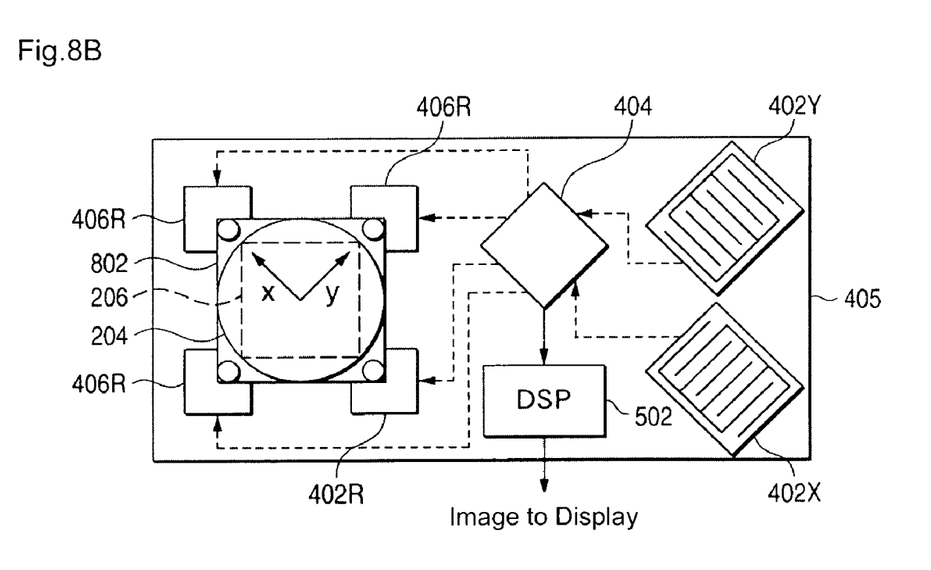
FIG. 8B depicts a top view of the implementation of FIG. 8A.

FIGS. 8A and 8B depict side and top views, respectively, of a first implementation of the embodiment of FIG. 5. This implementation is substantially identical to that shown in FIGS. 6A and 6B except that the camera module 202 does not include a camera digital signal processor. Instead, the signal processor, in this case a digital signal processor 502, is mounted to the circuit board 405.

Figure 9A:
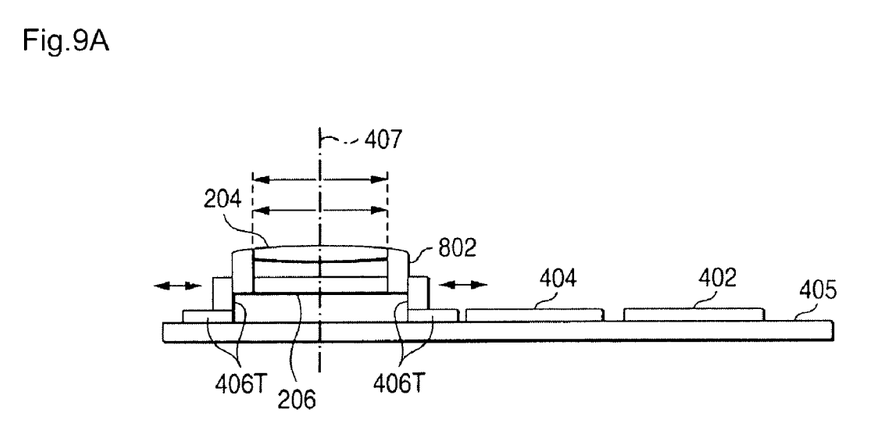
FIG. 9A depicts a side view of a second implementation of embodiment of FIG. 5.
Figure 9B:
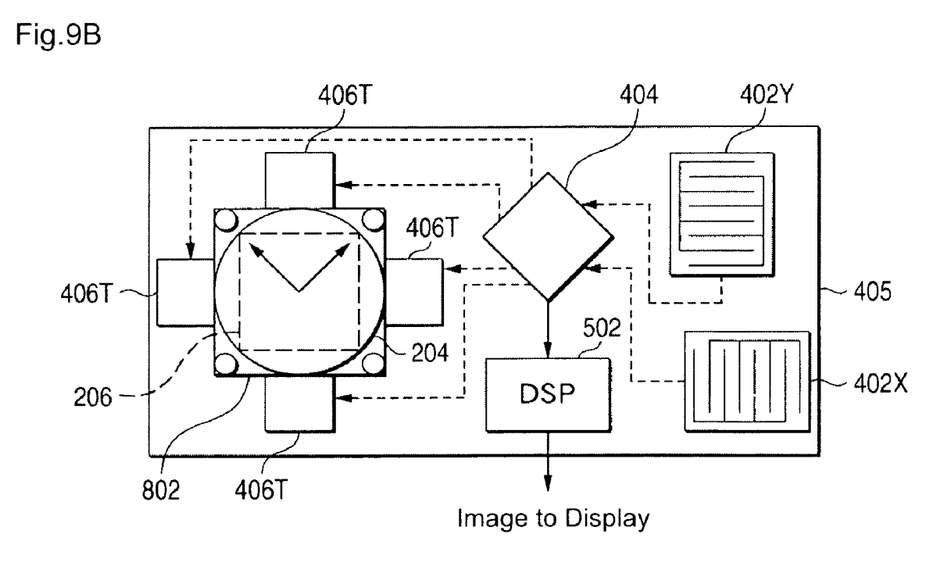
FIG. 9B depicts a top view of the implementation of FIG. 9A.

FIGS. 9A and 9B depict side and top views, respectively, of a second implementation of the embodiment of FIG. 5. This implementation is substantially identical to that shown in FIGS. 8A and 8B except that, again, the camera module 202 does not include a camera digital signal processor. Instead a digital signal processor 502 mounted to the circuit board 405 is used.

Figure 10:
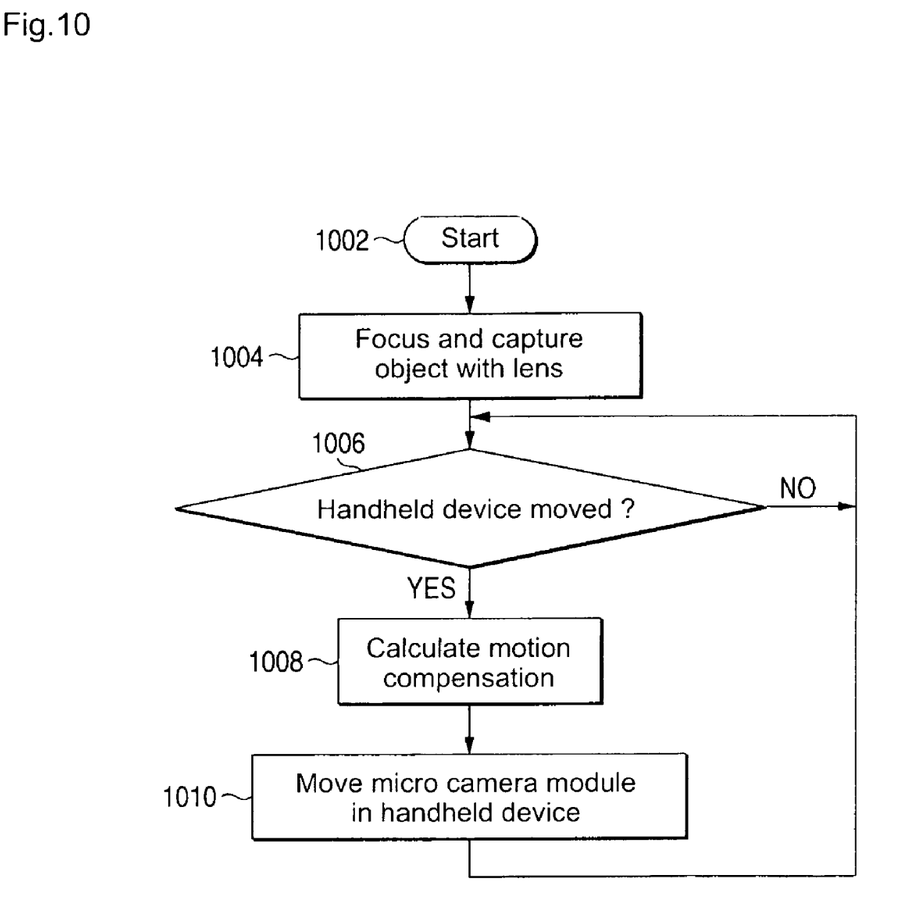
FIG. 10 depicts a flow chart of a method for stabilizing an image in accordance with the present invention.

FIG. 10 depicts a flow chart for implementing a method of the present invention for stabilizing an image obtained with a handheld device 100 having a camera. The method is activated when a user selects the image stabilization feature by depressing or otherwise selecting a button or sequence of buttons on the keyboard 112, step 1002. An object is focused upon using the lens 204, step 1004. A query checks the motion sensors to determine whether the handheld device 100 has been moved, step 1006. If there is no movement of the handheld device 100, the method returns to step 1006 so that, step 1008 is repeated until movement of the handheld device 100 has been detected. If movement of the handheld device 100 has been detected, the controller determines or calculates how to actuate the actuators to compensate for the movement of the handheld device, step 1008. The actuators are then instructed to move the micro camera module 202 (or the lens and image sensor, as appropriate) to compensate for the movement of the handheld device 100. After step 1010, the method returns to step 1006.

The image stabilization method applies only if movement of the handheld device 100 is within a predetermined threshold distance or angle relative to the viewing frame 208.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A handheld device comprising:
    a module comprising an optical lens assembly having an optical lens, the optical lens configured to provide an image of an object, the module further comprising an image sensor positioned to receive the image of the object from the optical lens, the image sensor configured to generate an electronic signal corresponding to the received image;
    a motion sensor comprising one of an accelerometer or a gyroscope configured to sense movement of at least the lens assembly and the image sensor and to generate a movement signal indicative of the movement of at least the lens assembly and the image sensor;
    an actuator comprising first and second actuator assemblies configured to provide respective movements of the module in two substantially perpendicular directions; and
    a controller operatively connected to the motion sensor and the actuator so as to receive from the motion sensor the movement signal and in response thereto to transmit a signal to the actuator to cause the module to move so as to substantially stabilize the image of the object formed on the image sensor by substantially correcting for the sensed movement of the lens assembly and the image sensor.

2. The handheld device of claim 1, further comprising a digital signal processor operatively connected to the image sensor for processing the electronic signal generated by the image sensor and for generating a processed electronic signal capable of driving a display to display the image of the object.

3. The handheld device of claim 2, further comprising a display operatively connected to the digital signal processor for displaying the image in response to receipt from the digital signal processor of the processed electronic signal.

4. The handheld device of claim 3, wherein the handheld device is a mobile phone.

5. The handheld device of claim 2, wherein the module comprise a camera module, wherein the actuator is configured so as to be capable of moving the camera module, and wherein the motion sensor senses movement of the camera module.

6. The handheld device of claim 2, further comprising a circuit board, wherein the motion sensor, the actuator, the controller, and the digital signal processor are each mounted directly on the circuit board, and the module is mounted on the actuator.

7. The handheld device of claim 1, wherein the optical lens assembly further comprises a means for causing the optical lens to focus on the object.

8. The handheld device of claim 1, wherein the handheld device is a mobile phone.

9. The handheld device of claim 1, wherein the optical lens has an optical axis, and wherein the actuator is configured so as to be capable of pivoting the optical axis of the optical lens by moving the module.

10. The handheld device of claim 9, wherein the handheld device is a mobile phone.

11. The handheld device of claim 9, wherein there are four actuators.

12. The handheld device of claim 1, wherein the optical lens has an optical axis, and wherein the actuator is configured so as to be capable of causing the module to move in a plane substantially perpendicular to the optical axis of the optical lens.

13. The handheld device of claim 12, wherein the handheld device is a mobile phone.

14. The handheld device of claim 1, wherein the optical lens has an optical axis, and wherein the actuator is configured so as to be capable of causing the module to move so as to pivot the optical axis of the optical lens, and to be capable of causing the module to move in a plane substantially perpendicular to the optical axis of the optical lens.

15. The handheld device of claim 14, wherein there are four actuators.

16. The handheld device of claim 12, wherein there are four actuators.

17. The handheld device of claim 12, wherein the actuator comprises first and second actuator assemblies arranged on opposing sides of the module, the first and second actuator assemblies configured to provide respective translations of the module in opposing directions in said plane, the actuator further comprising third and fourth actuator assemblies arranged on opposing sides of the module, the third and fourth actuator assemblies configured to provide respective translations of the module in opposing directions in said plane and substantially perpendicular to the translations of the first and second actuator assemblies.

18. The handheld device of claim 14, wherein the handheld device is a mobile phone.

19. The handheld device of claim 1, wherein two motion sensors are oriented so as to sense movement of at least the lens assembly and the image sensor in two substantially perpendicular directions.

20. The handheld device of claim 1, wherein there are four actuators.

21. The handheld device of claim 1, wherein each of the first and second actuator assemblies comprises one of a piezo actuator, a MEMS actuator, and a shaped memory alloy.

22. The handheld device of claim 1, further comprising a circuit board, wherein the motion sensor, the actuator, and the controller are each mounted directly on the circuit board, and the module is mounted on the actuator.

23. A method comprising:
    when forming an image of an object on an image sensor with at least one lens, wherein the at least one lens and image sensor are incorporated in a camera module of a handheld device, sensing movement of the at least one lens and the image sensor with a motion sensor comprising one of an accelerometer or a gyroscope;
    generating a movement signal indicative of the sensed movement of the at least one lens and the image sensor with the motion sensor; and moving, by an actuator comprising first and second actuator assemblies configured to provide respective movements of the camera module in two substantially perpendicular directions, the camera module in response to the movement signal so as to substantially stabilize the image of the object formed on the image sensor by substantially correcting for the sensed movement of the at least one lens and the image sensor.

24. The method of claim 23, wherein the camera module is moved so as to pivot an optical axis of the at least one lens.

25. The method of claim 23, wherein the camera module is moved in a plane substantially perpendicular to an optical axis of the lens.

26. The method of claim 23, wherein the camera module is moved so as to pivot an optical axis of the lens and is moved in a plane substantially perpendicular to an optical axis of the lens.

* * * * *